(12) United States Patent
Zhou et al.

(10) Patent No.: US 12,482,242 B1
(45) Date of Patent: Nov. 25, 2025

(54) DATA CENTRIC MISLABEL DETECTION (71) Applicant: LandingAI Inc., Palo Alto, CA (US)

(72) Inventors: Yu Qing Zhou, Stanford, CA (US);
Dillon Laird, Santa Monica, CA (US);
Yuxiang Zhang, Shanghai (CN);
Andrew Yan-Tak Ng, Camas, WA (US); Daniel Bibireata, Bellevue, WA (US); Kai Yang, Fremont, CA (US);
Shankaranand Jagadeesan, San Jose, CA (US); Mark William Sabini, River Edge, NJ (US)

(73) Assignee: LandingAI Inc., Palo Alto, CA (US)

( * ) Notice: Subject to any disclaimer, the term of this patent is extended or adjusted under 35 U.S.C. 154(b) by 214 days.

(21) Appl. No.: 18/227,800

(22) Filed: Jul. 28, 2023

Related U.S. Application Data (60) Provisional application No. 63/393,699, filed on Jul. 29, 2022.

(51) Int. Cl.
  *G06V 10/776*   (2022.01)
  *G06V 10/771*   (2022.01)
  *G06V 10/774*   (2022.01)

(52) U.S. Cl.
  CPC .......... *G06V 10/776* (2022.01); *G06V 10/771* (2022.01); *G06V 10/774* (2022.01)

(58) Field of Classification Search
  CPC .. G06V 10/776; G06V 10/771; G06V 10/774; G06V 10/82; G06V 10/764; G06V 20/52; G06V 10/7753; G06V 20/56; G06V 10/26; G06V 10/454; G06V 20/41; G06N 3/045; G06N 3/08; G06N 3/084; G06N 20/00; G06N 3/04; G06N 3/047; G06N 3/044; G06N 3/063; G06N 3/09; G06N 7/01; G06F 18/217; G06F 18/214; G06F 18/2148; G06F 18/2431; G06F 18/2155; G06F 18/22; G06F 18/24; G06F 18/24133; G06T 2207/20081; G06T 2207/20084; G06T 2207/10072
  See application file for complete search history.

(56) References Cited

U.S. PATENT DOCUMENTS

| | | | |
|---|---|---|---|
| 9,311,609 B2 * | 4/2016 | Marcheret | G06N 7/00 |
| 11,055,580 B2 * | 7/2021 | Amon | G06F 18/2431 |
| 11,921,820 B2 * | 3/2024 | Khanna | G06N 5/01 |
| 11,941,884 B2 * | 3/2024 | Kuen | G06V 10/751 |

(Continued)

*Primary Examiner* — Michael S Osinski
(74) *Attorney, Agent, or Firm* — Fenwick & West LLP (57) ABSTRACT

A system or method for identifying mislabels in a training dataset. The labeled dataset includes multiple labeled samples, each of which is labeled with a ground-truth label. The labeled samples are divided into multiple training subset and hold-out test subset. For each training subset and corresponding hold-out test subset, a machine learning model is trained using the training subset, and the trained machine learning model is applied to the hold-out test subset to generate prediction labels for samples in the corresponding hold-out test subset. Each prediction label has a confidence score indicating a likelihood of the prediction label is correct. A pair of prediction label and ground truth label corresponding to a same sample is compared to determine whether there is a candidate mislabel. The system determines whether the candidate mislabel is a mislabel based in part on a confidence score of the prediction label.

20 Claims, 9 Drawing Sheets

(56) References Cited

U.S. PATENT DOCUMENTS

| | | | | |
|---|---|---|---|---|
| 2009/0092299 | A1* | 4/2009 | Jerebko | G06F 18/217 |
| | | | | 382/128 |
| 2012/0263376 | A1* | 10/2012 | Wang | G06V 10/774 |
| | | | | 382/160 |
| 2013/0254153 | A1* | 9/2013 | Marcheret | G06N 7/00 |
| | | | | 706/59 |
| 2018/0068218 | A1* | 3/2018 | Yoo | G06N 3/084 |
| 2018/0357540 | A1* | 12/2018 | Hwang | G06V 30/19173 |
| 2019/0251398 | A1* | 8/2019 | Godwin, IV | G06F 18/217 |
| 2019/0325299 | A1* | 10/2019 | Oliveira Pinheiro | G06N 3/08 |
| 2020/0250473 | A1* | 8/2020 | Elluswamy | G05D 1/0221 |
| 2020/0349464 | A1* | 11/2020 | Lin | G06N 3/084 |
| 2021/0027103 | A1* | 1/2021 | Brower | G06N 3/08 |
| 2021/0089824 | A1* | 3/2021 | Ge | G06F 18/214 |
| 2021/0343030 | A1* | 11/2021 | Sagonas | G06T 7/30 |
| 2021/0357804 | A1* | 11/2021 | Lopez | G06N 20/00 |
| 2022/0051025 | A1* | 2/2022 | Li | G06V 10/62 |
| 2022/0051105 | A1* | 2/2022 | Fukuda | G10L 15/063 |
| 2022/0156583 | A1* | 5/2022 | Zhang | G06V 10/454 |
| 2022/0217170 | A1* | 7/2022 | Qi | G06N 3/08 |
| 2022/0335258 | A1* | 10/2022 | Raventos | G06N 3/084 |
| 2022/0375038 | A1* | 11/2022 | Nagare | G06V 10/30 |
| 2023/0082050 | A1* | 3/2023 | Li | G06T 11/001 |
| 2023/0087526 | A1* | 3/2023 | Huang | G06V 20/30 |
| | | | | 382/156 |
| 2023/0245450 | A1* | 8/2023 | Golestaneh | G06V 10/764 |
| | | | | 382/100 |
| 2023/0267766 | A1* | 8/2023 | Nguyen | G06V 20/52 |
| | | | | 382/157 |
| 2023/0290118 | A1* | 9/2023 | Min | G06V 40/161 |
| 2023/0368507 | A1* | 11/2023 | Didari | G06V 10/764 |
| 2023/0386611 | A1* | 11/2023 | Schulz-Trieglaff | |
| | | | | G06F 9/3877 |
| 2024/0144654 | A1* | 5/2024 | Gurvich | G06V 10/776 |
| 2024/0169272 | A1* | 5/2024 | MacWilliams | G06N 20/00 |
| 2024/0303973 | A1* | 9/2024 | Ramos Dos Santos | |
| | | | | G06V 10/774 |

\* cited by examiner

DATA CENTRIC MISLABEL DETECTION

CROSS-REFERENCE TO RELATED APPLICATION

This application claims the benefit of a U.S. Provisional Application No. 63/393,699, titled "Data-Centric Mislabel Detection," filed Jul. 29, 2022, which is incorporated herein by reference in its entirety.

BACKGROUND

1. Technical Field

This disclosure relates generally to machine learning, and more particularly to detecting mislabeled training data.

2. Description of Related Art

In various scenarios, there is a need to classify objects into categories, detect objects, or segment images. Machine learning may be implemented to train models to perform these tasks. In supervised learning, models are trained using labeled data, and when working with image samples, these images are assigned labels (e.g., labels that indicate one or more classifications for an image as a whole, objects present within an image, and so on). For instance, the task might involve classifying images as either "OK" or "no good" to determine the presence of detects. Alternatively, in object detection, the goal may be to identify different types of defects within an image.

In the context of defect detection, manufacturers inspect their products for flaws, often relying on human inspectors. Typically, the manufacturer establishes the criteria for what constitutes a defect and specifies the conditions under which a product fails inspection. This knowledge resides with human inspectors who then train others to perform visual inspections. However, defining defects consistently, clearly, and accurately can be challenging, especially considering that defects are not commonly encountered. As a result, visual inspection results may vary in their consistency, accuracy, and consume significant time and resources.

The problem becomes more pronounced when manufacturers attempt to leverage artificial intelligence or machine learning for quality inspections. Machine learning techniques enable computers to learn from input data and develop models capable of identifying defects versus non-defects, thereby eliminating the need for complex and inflexible algorithms that describe defect characteristics across various conditions.

However, the accuracy of machine learning algorithms heavily depends on the quality of the training data. Flawed training data, such as mislabeled examples (defects classified as non-defects), missing labels on target objects (e.g., failing to label a defect in an image), or imprecise labels (e.g., grouping two defects as one), can easily lead to inaccurate algorithms. Consequently, the quality of labeling plays a critical role in the successful development of machine learning systems. If the training data is inadequate, the machine learning model will not receive proper training and will fail to achieve the expected performance in defect inspection.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

SUMMARY

Embodiments described herein include a method or a system for detecting mislabeled training data samples. The system accesses a training dataset comprising a plurality of labeled samples. Each of the plurality of labeled samples is labeled with a ground-truth label. The system divides the plurality of labeled samples into a plurality of training subsets and hold-out test subsets. In some embodiments, the system divides the plurality of labeled samples into N subsets, wherein N is a natural number that is greater than 1. For each of N subsets, the system selects the subset as a hold-out test subset, and the remaining (N−1) subsets as a training subset to train a machine learning model.

For each of a training subset and a corresponding hold-out test subset, the system trains a machine learning model using the training subset, and applies the trained machine learning model to the corresponding hold-out test subset to generate prediction labels for samples in the corresponding hold-out test subset. Each prediction label has a confidence score indicating a likelihood that the prediction label is correct.

The system pairs prediction labels and ground truth labels corresponding to same samples, and compares a pair of prediction label and ground truth label corresponding to a same sample to determine whether there is a candidate mislabel. The system also determines whether the candidate mislabel is a mislabel based in part on a confidence score of the prediction label, and generates for display the determined mislabel.

DETAILED DESCRIPTION

Supervised training uses labeled datasets as ground truth to train a machine-learning model. Different machine learning techniques allow computers to observe labeled datasets and develop models to accomplish different tasks, such as classification tasks, segmentation tasks, and/or object detection tasks. For example, in a classification task, a classification model is trained to classify an image as one or more categories (e.g., a first type of defect vs. a second type of defect); in a segmentation task, each pixel in an image is classified into categories on the basis of instances to detect boundaries; or in an object detection task, an object detection model is trained to detect multiple classes of objects (e.g., different foreign objects in food product). Such models save engineering efforts to come up with complex, hardcode algorithms to describe the characteristics of defects under all conditions.

In some embodiments, for a given labeled dataset, 70% of examples (called "training set") in a labeling dataset are used to train a model, and the remaining 30% of examples (called "hold-out test set") are used to evaluate the trained model. Thus, only 30% of the examples are inspected by the machine-learning model.

Further, because deep neural networks have a high learning capacity, they are prone to overfitting the examples. This means that the machine-learning models can learn from all possible signals from the training data, even when there are mislabels. An overfit model trained by a training dataset including mislabeled training samples may output wrong predictions for new images that fit the mislabeled training samples.

As such, the quality of the input data determines the accuracy of the output algorithms. If the input data contains mislabels, such as an error in labeling classes (e.g., labeling a first type of defect as a second type of defect), missing a label on target objects (e.g., forgetting to label a traffic light in an image), or imprecise labels (label two traffic lights as one), these errors will cause the computers to generate an overfitted model and lead to inaccurate algorithms. Therefore, labeling quality is key to successful machine learning development.

However, it is common that there are mislabels in the labeled datasets. Such deficient labeled datasets will result in improperly trained machine-learning models that could not achieve the expected results. One solution to solve this problem is to manually correct these mislabels, which is time-consuming and resource-consuming.

The embodiments described herein solve the above problem by automatically detecting mislabeled samples in a given labeled dataset and generating better labels to fix the mislabeled samples. This can significantly reduce users' time to manually go through the labeled dataset and look for mislabels, reduce the time required to train a machine learning model, and/or increase the accuracy of the machine learning model.

In some embodiments, multi-fold machine learning is used to identify mislabels in a labeled dataset. The labeled dataset includes a plurality of samples labeled with ground-truth labels. First, the system trains multiple machine-learning models using subsets of the labeled dataset and applies the multiple machine-learning models to the plurality of samples in the labeled dataset to generate prediction labels for all the samples. Each prediction label has a confidence score. The system then compares the prediction labels with the ground-truth labels to identify candidate mislabels and determines whether the candidate mislabels are mislabels based in part on the confidence scores of the corresponding prediction labels. The system may then generate new labels for the mislabeled samples, and displays the new labels to the users.

In some embodiments, the system divides the plurality of samples into a plurality of subsets. In some embodiments, the plurality of samples are divided evenly, such that each of the plurality of subsets has a same number of samples. Alternatively, the plurality of samples may not be divided evenly, such that each of the plurality of subsets does not necessarily have a same number of samples. For each subset, there is a remaining subset, and the subset and the remaining subset form the whole labeled dataset. For each subset, the system trains a machine-learning model using the corresponding remaining subset, and uses the subset as a hold-out test subset. The machine-learning model is applied to the hold-out test subset to predict a result for each sample in the subset. For example, for a first subset, the system trains a first machine-learning model, and applies the first machine-learning model to the first subset to predict a result for each sample in the first subset. Each predicted result is associated with a confidence score, indicating a likelihood of the predicted result is correct. Again, for a second subset, the system trains a second machine-learning model, and applies the second machine-learning model to the second subset to predict a result for each sample in the second subset. This process repeats until each sample in each subset corresponds to a predicted result. The predicted results are then compared with the ground truth labels, which are the original labels in the training dataset. If a predicted result and a ground truth label do not match, the system then looks into a confidence score associated with the predicted result.

In some embodiments, if the confidence score is greater than a first threshold, the system replaces the ground truth label with the predicted result. Alternatively, or in addition, if a confidence score is lower than a second threshold, the system keeps the ground truth label. In some embodiments, the first threshold and the second threshold are the same. In some embodiments, the first threshold is greater than the second threshold. When a confidence score is between the first threshold and the second threshold, the system reports the mismatch to a user, allowing the user to determine manually whether the ground truth label should be replaced by the predicted label.

Figure 1:
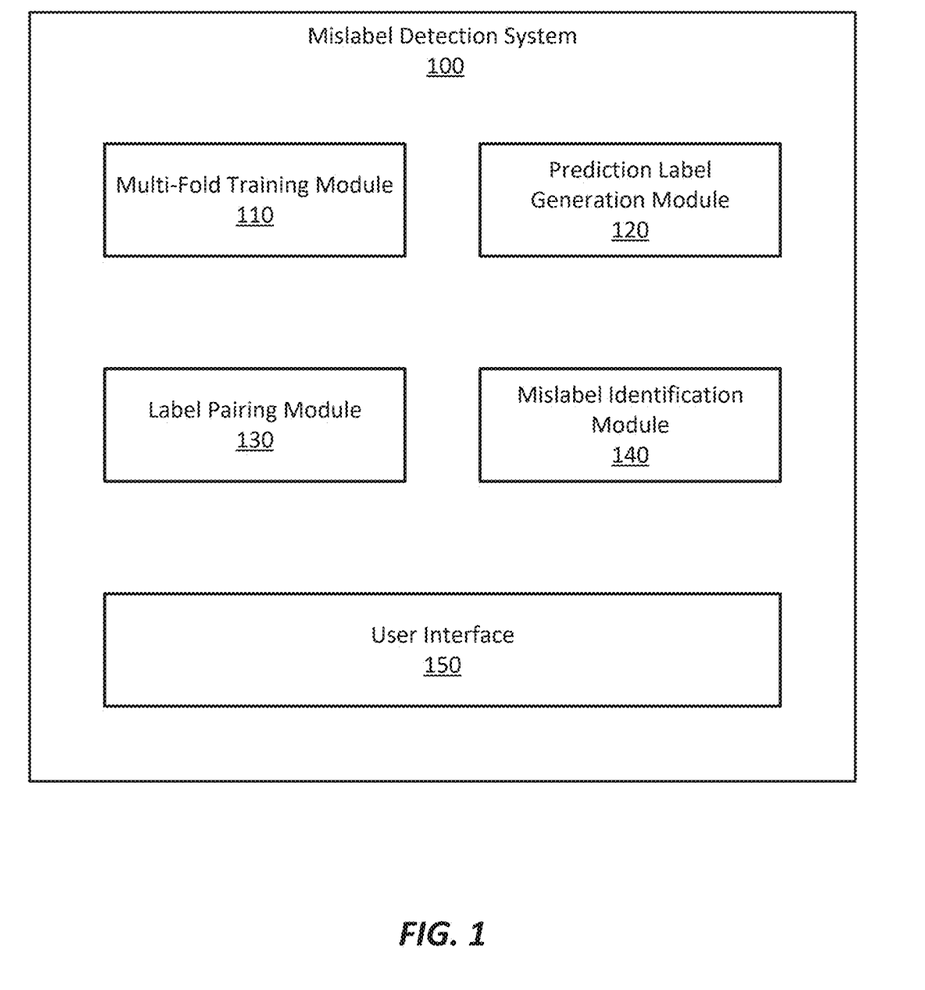
FIG. 1 illustrates a diagram of a system for identifying mislabels in a labeled dataset, according to some embodiments.

FIG. 1 illustrates a diagram of a mislabel detection system 100 according to some embodiments. In some embodiments, system 100 may be implemented as an online system providing a service to users. In some embodiments, system 100 may be implemented on a client device of a user. The client device may have access to the labeled dataset directly or indirectly.

The mislabel detection system 100 includes a multi-fold training module 110, a prediction label generation module 120, a label pairing module 130, a mislabel identification module 140, and a user interface 150. Alternative embodiments may include more, fewer, or different components from those illustrated in FIG. 1, and the functionality of each component may be divided between the components differently from the description below. Additionally, each component may perform their respective functionalities in response to a request from a human or automatically without human intervention.

The multi-fold training module 110 is configured to train multiple machine-learning models using different portions of a training dataset. Such a training process is herein referred to as "multi-fold training." Additional details about multi-fold training are described below with respect to FIGS. 2A-2B. After the multiple machine-learning models are trained, the prediction label generation module 120 is configured to apply the multiple machine-learning models to the training dataset to generate predictions and relabel the training dataset with prediction labels. As such, many samples in the training dataset now correspond to a ground truth label and a prediction label.

The label pairing module 130 is configured to pair the prediction labels with ground truth labels. Note, not every ground truth label corresponds to a prediction label, and vice versa. Label pairing module 130 identifies the ground truth labels that can be paired with prediction labels. There may be the ground truth label that cannot be paired with a prediction label, and/or the prediction label that cannot be paired with a ground truth label. These unpaired labels are also identified by the label pairing module 130.

The mislabel identification module 140 is configured to identify mislabels based on the pairing and the unpaired labels. For example, for a pair of ground truth label and prediction label, if they indicate different types of defect, the mislabel identification module 140 may identify the ground truth label as a candidate mislabel. For the unpaired labels, they may also be identified as a candidate mislabel.

Additional details associated with the label paring module 130, and mislabel identification module 140 are further discussed below with respect to FIGS. 3A through 3C.

The user interface 150 is configured to present the detected mislabels to users. In some embodiments, the user interface 150 displays a sample image, highlighting a portion of the sample image where the detected mislabel may occur. In some embodiments, the user interface 150 suggests a correct label to a user, allowing the user to accept or reject the suggestion. In some embodiments, the user interface 150 prompts a user to upload a labeled dataset or submit an address, linking to the labeled dataset.

Figure 2A:
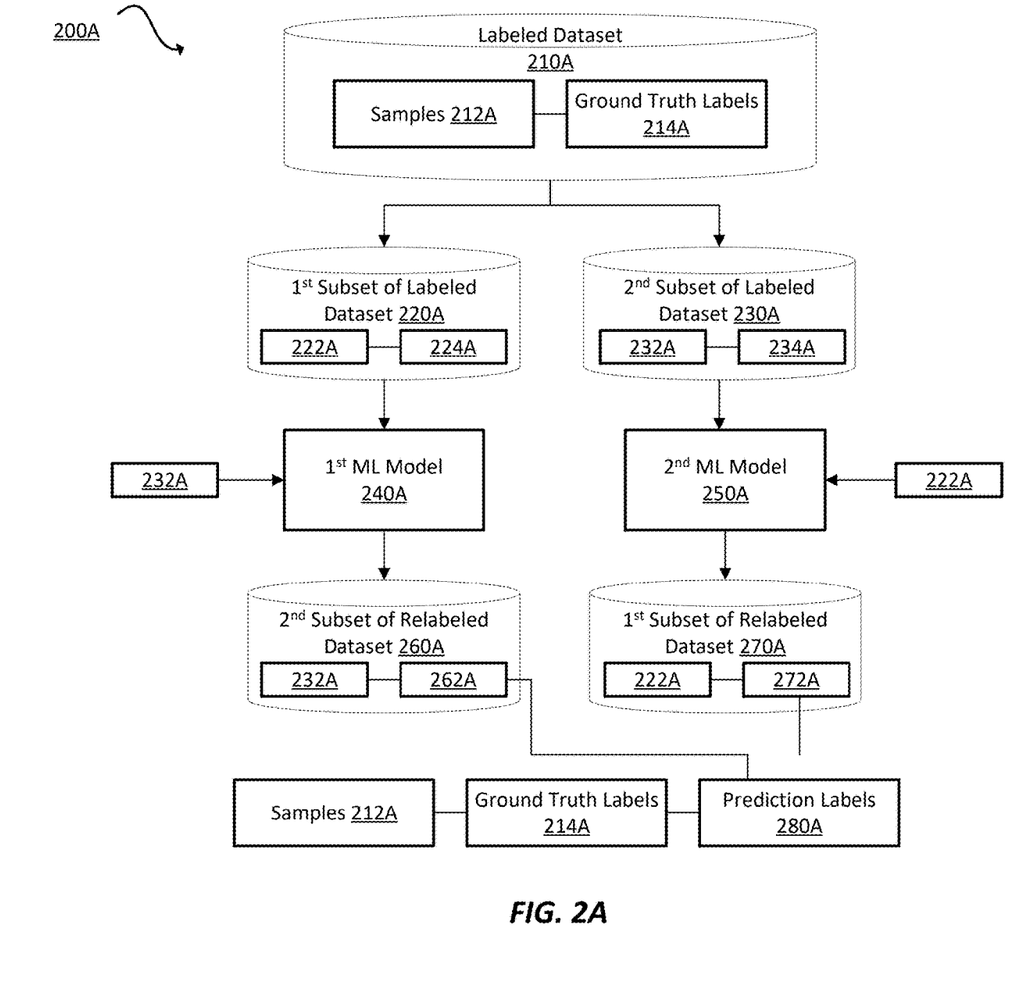
FIG. 2A illustrates a diagram of a process of using 2-fold training to identify mislabels in a labeled dataset, according to some embodiments.

FIG. 2A illustrates a diagram of a process 200A for using two-fold training to identify mislabels in a labeled dataset 210A, according to some embodiments. The labeled dataset 210A includes a plurality of samples 212A, labeled with ground-truth labels 214A. During a two-fold training, the labeled dataset 210A is divided into two subsets. The two subsets may or may not be equal in size. Note, the two-fold training illustrated in FIG. 2A is merely an example. The principles described herein may be applied to any multi-fold training. For example, during a three-fold training, the labeled dataset 210A would be divided into three subsets. The three subsets may or may not be equal in size. During an N-fold training, the labeled dataset 210A would be divided into N subsets.

As illustrated in FIG. 2A, the multi-fold training module 110 divides the labeled dataset 210A into two subsets, namely a first subset of labeled dataset 220A and a second subset of labeled dataset 230A. The first subset of labeled dataset 220A includes a first subset of samples 222A, labeled with a first subset of ground-truth labels 224A. The second subset of labeled dataset 230A includes a second subset of samples 232A, labeled with a second subset of ground-truth labels 234A.

Next, multi-fold training module 110 trains a first machine-learning model 240A using the first subset of labeled dataset 220A, and trains a second machine-learning model 250A using the second subset of labeled dataset 230A. The first machine-learning model 240A is then used to process the second subset of samples 232A (which is a hold-out test subset for the first machine-learning model 240A) to generate prediction labels 262A, and relabel the second subset of samples 232A with the prediction labels 262A to generate a second subset of relabeled dataset 260A. Similarly, the second machine-learning model 250A is used to process the first subset of samples 222A (which is a hold-out test subset for the second machine-learning model 250A) to generate prediction labels 272A, and relabel the first subset of samples 222A to generate a first subset of relabeled dataset 270A. As such, all the samples 212A are now relabeled with prediction labels 262A, 272A (collectively, also referred to as prediction labels 280A). Each of these prediction labels 280A is associated with a confidence score, indicating how confident the prediction is, i.e., the higher the confidence score, the more likely the prediction label is correct, and vice versa.

The label paring model 130 pairs the ground truth labels 214A with prediction labels 280A. Additional details about how the labels are paired are further described below with respect to FIGS. 3A-3C.

In some embodiments, for the paired ground-truth label(s) 214A and prediction label(s) 280A, the mislabel identification module 140 compares the corresponding ground-truth label(s) 214A and prediction label(s) 280A to identify candidate mislabels. Finally, the mislabel identification module 140 determines that a candidate mislabel is a mislabel based in part on the confidence score of the corresponding prediction label. For example, when the confidence score of the corresponding prediction label is greater than a predetermined threshold, the mislabel identification module 140 determines that there is a mislabel. In some embodiments, the threshold is determined based on an overall confidence score of the prediction labels. In some embodiments, when the machine learning models are object detection models, for each class of object, a separate threshold is set based on the overall confidence score of the corresponding class. For example, the first class may be a first type of defect (denoted as "defect 1"), and the second class may be a second type of defect (denoted as "defect 2").

When the predictions of defect 1 have an overall confidence level of 0.8, and the predictions of defect 2 have an overall confidence level of 0.7, the mislabel identification module 140 sets a first threshold for predictions of defect 1, which is associated with the overall confidence level of 0.8, and sets a second threshold for predictions of defect 2, which is associated with the overall confidence level of 0.7.

In some embodiments, the threshold is set to be equal to the overall confidence level. Using the same example (in which an overall confidence level for predictions of defect 1 is 0.8, and an overall confidence level for predictions of defect 2 is 0.7), the first threshold for defect 1 is 0.8, and the second threshold for defect 2 is 0.7. For example, when the system identifies a candidate mislabel, where the ground-truth label is defect 2, and the prediction label is defect 1 having a confidence level of 0.75. The first threshold for defect 1 (i.e., 0.8) applies. Since the prediction label's confidence level is 0.75, which is lower than the first threshold for predictions of defect 1, the mislabel identification module 140 determines that there is no mislabel.

As another example, when the ground-truth label is defect 1, and the prediction label is defect 2 having a confidence level of 0.75. The second threshold for defect 2 (i.e., 0.7) applies. Since the prediction label's confidence level is 0.75, which is greater than the second threshold for predictions of defect 2, the system determines that there is a mislabel. In some embodiments, in response to determining a mislabel, the mislabel identification module 140 displays the determined mislabel to a user. In some embodiments, the mislabel identification module 140 also suggests replacing the mislabel with a predicted label, e.g., replacing the defect 1 label with a defect 2 label.

Multi-Fold Training

In some embodiments, training of the multiple machine-learning models is performed using different portions of a training dataset. As briefly discussed above, such a training process is also referred to as "multi-fold training." During a multi-fold training, a labeled dataset is divided into a number (N) of subsets. The N subsets may or may not be equal in size. The N subsets are then used to train N machine-learning models. For example, each (N−1) subset is used to train a separate model, and the remaining subset is then used as a hold-out test subset. Each trained model is used to label the samples in its own hold-out test subset. As such, all the examples in the labeled dataset can be relabeled with prediction labels. The N machine-learning models may be trained separately, sequentially, simultaneously, and/or a combination thereof. The N machine-learning models may be trained by a same computer system or different computer systems.

In some embodiments, N ranges between 2 to 4, depending on the number of examples in the labeled dataset. As illustrated in FIG. 2A, N=2, i.e., the labeled dataset 210A is divided into two subsets.

Figure 2B:
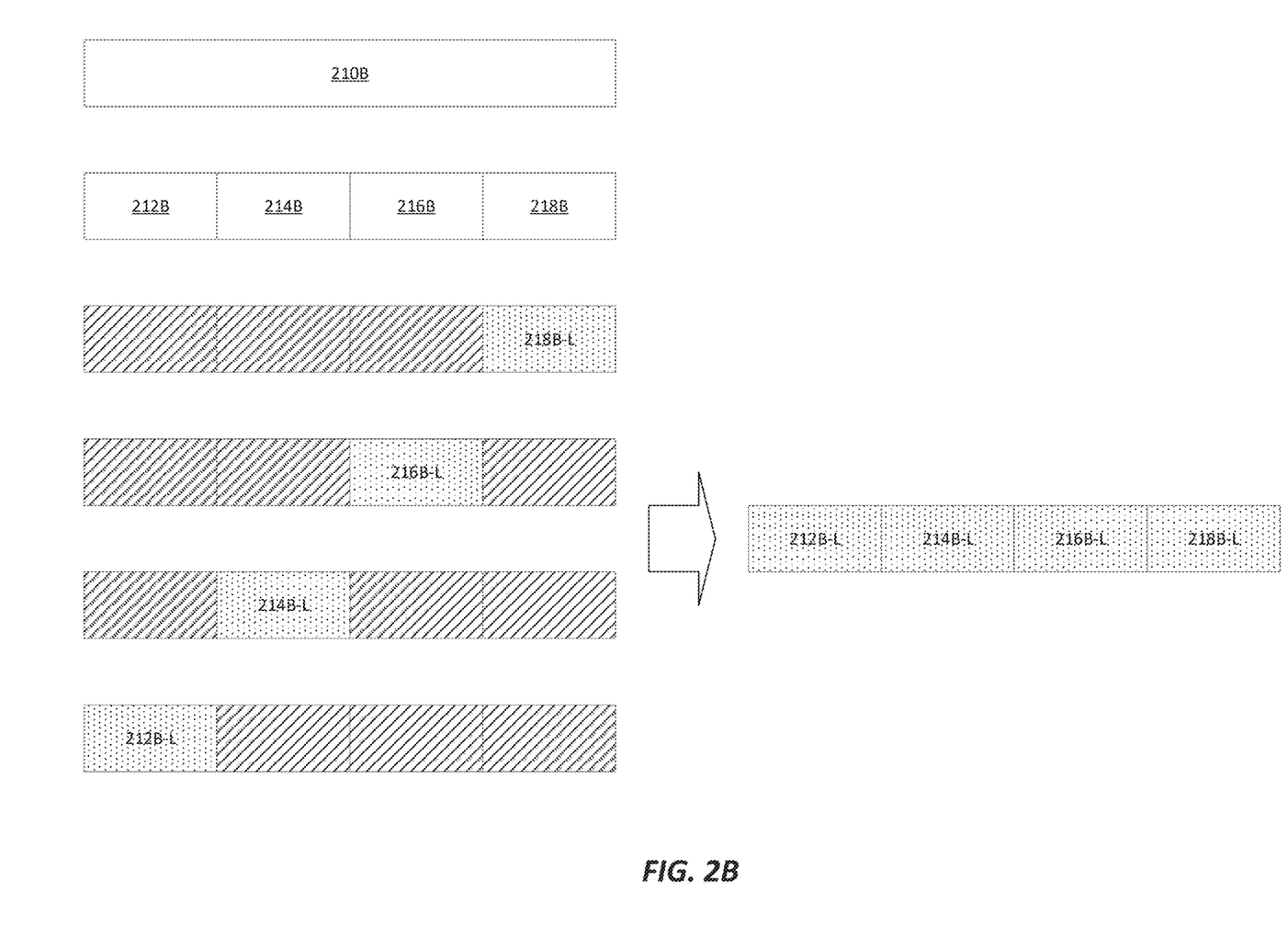
FIG. 2B illustrates a diagram of a process of multi-fold training, according to some embodiments.

FIG. 2B illustrates a diagram of a process of multi-fold training according to another embodiment. As illustrated in FIG. 2B, a labeled dataset 210B is divided into four equal subsets 212B, 214B, 216B, 218B. Four machine-learning models are trained using three subsets of the labeled dataset 210B. For example, a first machine-learning model is trained using the subsets 212B, 214B, 216B, and subset 218B is its hold-out test subset. After the first machine-learning model is trained, it is applied to its hold-out test subset 218B to generate prediction labels 218B-L for the subset 218B. A second machine-learning model is trained using subsets 212B, 214B, 218B, and subset 216B is its hold-out test subset. After the second machine-learning model is trained, it is applied to its hold-out test subset 216B to generate prediction labels 216B-L. Similarly, a third machine-learning model is trained using subsets 212B, 216B, 218B, and subset 214B is its hold-out test subset. After the third machine-learning model is trained, it is applied to its hold-out test subset 214B to generate prediction labels 214B-L. Again, a fourth machine-learning model is trained using subsets 214B, 216B, 218B, and subset 212B is its hold-out test subset. After the fourth machine-learning model is trained, it is applied to its hold-out test subset 212B to generate prediction labels 212B-L. The prediction labels 212B-L, 214B-L, 216B-L, and 218B-L include prediction labels for all the samples in the labeled dataset 210B.

Preprocessing

After all the samples in the whole labeled dataset are relabeled, the label paring module 130 compares the relabeled samples (also referred to as prediction labels) with the originally labeled samples (also referred to as ground-truth labels) to generate data pairs. For classification tasks, each image has one ground-truth label and one prediction label. The ground-truth label and the prediction label are paired together. The paired ground-truth label and the prediction label can then be compared to identify mismatches.

Similarly, for segmentation tasks, each pixel per image has one ground-truth label and one prediction label. In some embodiments, each pixel is labeled as positive or negative, and adjacent pixels with a same label are merged together to identify an area that is to be segmented. The ground-truth label and the prediction label are paired together. The paired ground-truth label and the prediction label can then be compared to identify mismatches.

For object detection tasks, there may be multiple ground-truth labels and multiple prediction labels per image, which may or may not form a one-on-one matching pair. For example, each ground-truth label or prediction label corresponds to an area on the image, although these areas may or may not be the same size or overlap each other. Thus, additional preprocessing may be performed to pair ground-truth labels and prediction labels for object detection tasks.

In some embodiments, the label pairing module 130 determines for each ground-truth label on the image, whether there is a prediction label that overlaps the ground-truth label. For example, a ground-truth label corresponds to a first area, and a prediction label corresponds to a second area. The label pairing module 130 determines whether the second area overlaps the first area. When there is more than one second area (corresponding to a prediction label) that overlaps the first area of the ground-truth label, the label pairing module 130 then determines a degree of overlapping between each second area and the first area, and selects the prediction label that corresponds to the highest degree of overlapping. The selected prediction label and the ground-truth label are then paired together.

Note, in embodiments, each ground-truth label is paired with at most one prediction label, and each prediction label is paired with at most one ground-truth label. Further, there may be a ground-truth label that does not overlap any prediction label; such a ground-truth label will be paired with no prediction label, indicating that there is a discrepancy between the ground-truth label and the prediction label. Similarly, a prediction label may not overlap with any ground-truth label, such a prediction label will also be paired with no ground-truth label, indicating that there is a discrepancy between the ground-truth label and the prediction label.

Figure 3A:
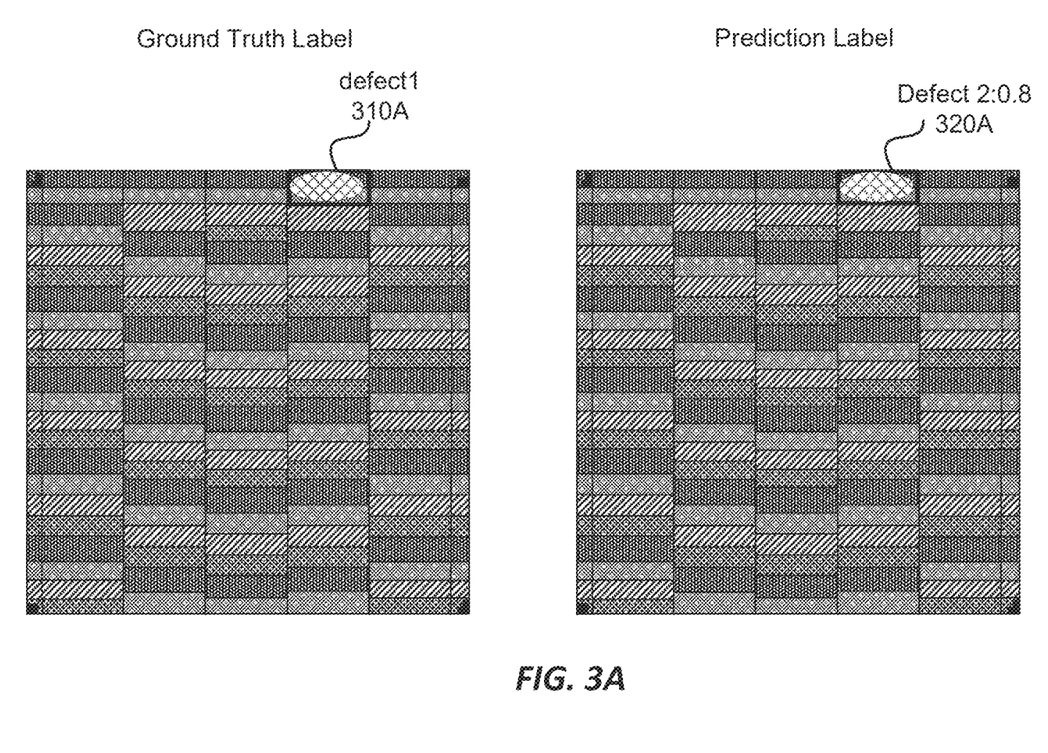
FIG. 3A illustrates a sample image being labeled with a ground-truth label and a prediction label, according to some embodiments.

FIG. 3A illustrates a sample image being labeled with a ground-truth label 310A and a prediction label 320A. The ground-truth label 310A labels a first area having four corners at points [463, 1, 526, 69], and the ground-truth label 310A labels the first area as having defect 1. The prediction label 320A labels a second area having four corners at points [463, 0, 552, 65], which overlaps the first area. The prediction label 320A labels the second area as having defect 2 with a confidence level of 0.8.

The label pairing module 130 determines that the first area (corresponding to the ground-truth label 310A) overlaps the second area (corresponding to the prediction label 320A). Further, since the ground-truth label 310A (labeled as defect 1) and the prediction label 320A (labeled as defect 2) are different, the mislabel identification module 140 identifies the ground-truth label 310A as a candidate mislabel. The mislabel identification module 140 then considers the prediction label 320A's confidence level in determining whether the candidate mislabel is a mislabel. In some embodiments, the mislabel identification module 140 may set a threshold confidence level. If the prediction label 320A's confidence level is greater than the threshold confidence level, the mislabel identification module 140 determines that the candidate mislabel is a mislabel based on the confidence level. For example, if the prediction label 320A's confidence level is 0.8, and the threshold confidence level is 0.7, the mislabel identification module 140 determines that the candidate mislabel is a mislabel.

Figure 3B:
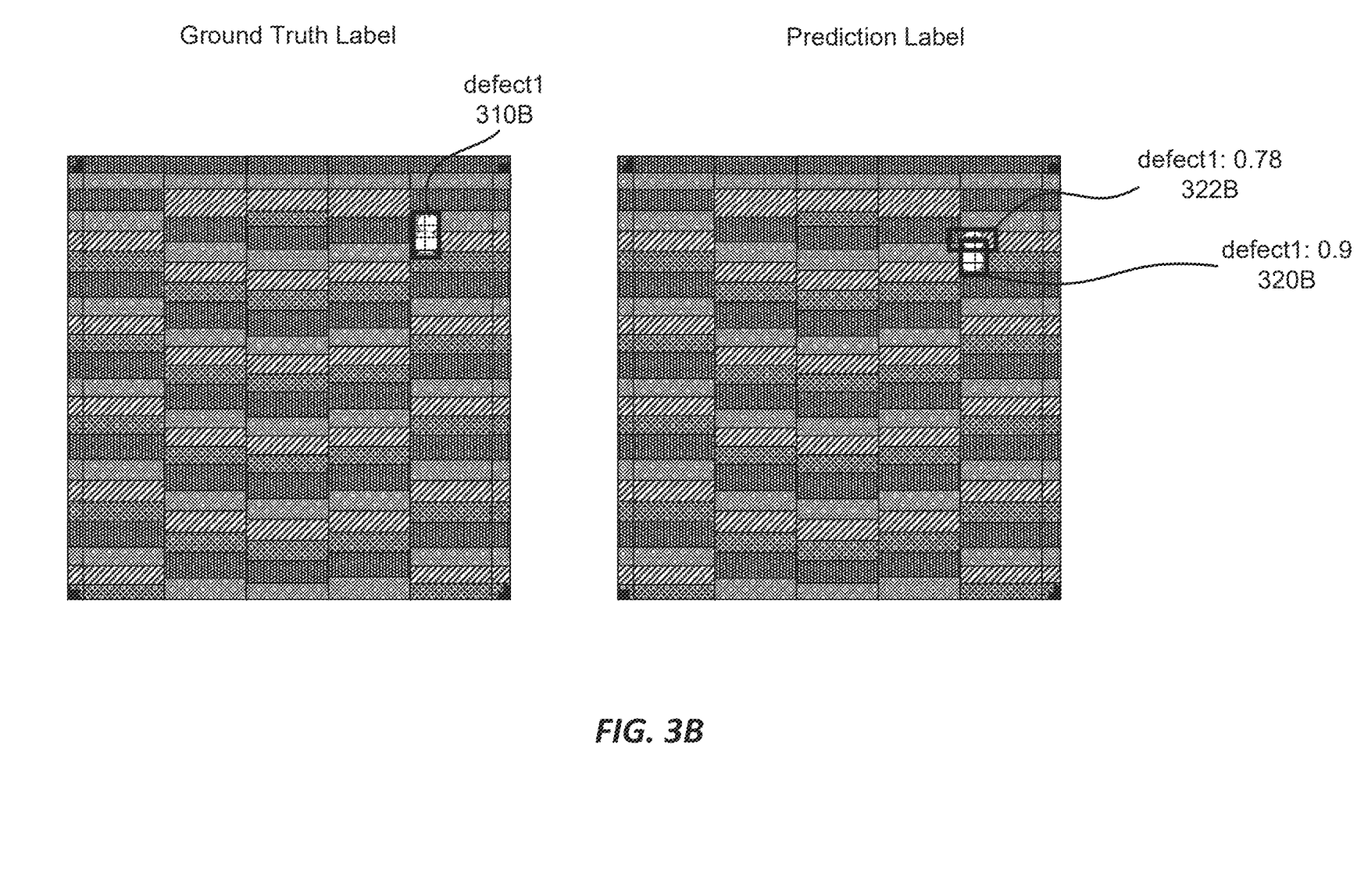
FIG. 3B illustrates another sample image being labeled with a ground-truth label and two prediction labels, according to some embodiments.

FIG. 3B illustrates another sample image being labeled with a ground-truth label 310B and two prediction labels 320B and 322B. The ground-truth label 310B labels a first area having four corners at points [551, 119, 592, 188], and the ground-truth label 310B indicates that the first area as having defect 1. The prediction labels 320B and 322B correspond to two second areas having four corners at points [549, 149, 592, 187] and [546, 114, 578, 144]. Both of these second areas (labeled with prediction labels 320B, 322B) overlap the first area labeled by ground-truth label 310B. In such a case, the label pairing module 130 determines a degree of overlap for each prediction label 320B, 322B and selects a prediction label that has a highest degree of overlap. For example, the prediction label 320B (corresponding to the second area having four corners at points [549, 149, 592, 187]) has a higher degree of overlap compared to the prediction label 322B (corresponding to the second area having four corners at points [546, 114, 578, 144]). Thus, the prediction label 320B is selected and paired with the ground-truth label 310B. The prediction label 322B is paired with nothing.

Again, the mislabel identification module 140 compares the paired prediction label 320B with the ground-truth label 310B. Here, the prediction label 320B predicts a defect 1 (with a confidence level of 0.9), which is the same as the ground-truth label 310B. Thus, the ground-truth label 310B is not a candidate mislabel. However, the prediction label 322B predicts a defect 1, but no ground-truth label is paired with it. Thus, there is a mismatch here. The second area corresponding to the prediction label 322B will be identified as a candidate mislabel. The confidence level of the prediction label 322B is 0.78, which may then be used to determine whether the candidate mislabel is a mislabel.

Find Mislabels and Generate Suggestions

After all the ground-truth labels and prediction labels are paired with each other or nothing, the mislabel identification module 140 then evaluates these pairs to identify mislabels based in part on overall confidence levels of the machine-learning models and/or the confidence levels of the predicted labels.

In some embodiments for classification models or segmentation models, a confidence threshold may be set based on the prediction labels' overall confidence. For object detection models, each class has a separate overall confidence level; thus, for each class, a confidence threshold is set based on the class's overall confidence level. For example, in some embodiments, the confidence threshold for each class is a function of that class's overall confidence level. For example, for a class that the models tend to make predictions with higher confidence, a higher confidence threshold will be set for that class. On the other hand, for a class that the models tend to make predictions with lower confidence, a lower confidence threshold will be set for that class. Each class corresponds to a type of object that may be detected. For example, in FIGS. 3A and 3B, the classes include defect 1 and defect 2.

Thereafter, the mislabel identification module 140 identifies ground-truth-prediction label pairs whose classes differ. The mislabel identification module 140 then compares the prediction label's confidence score with the confidence threshold of the predicted class. In response to the confidence score being greater than the confidence threshold, the mislabel identification module 140 determines that the ground-truth label may be a mislabel. For example, a first class may have a first confidence level 0.82, and the system sets a first confidence threshold for the first class as 0.82. When a candidate mislabel corresponds to a prediction label of the first class with a confidence level greater than 0.82, the candidate mislabel will be determined as a mislabel. As another example, a second class may have a second confidence level 0.78, and the system sets a second confidence threshold for the second class as 0.78. When a candidate mislabel corresponds to a prediction label of class 2 with a confidence level greater than 0.78, the candidate mislabel will be determined as a mislabel.

In some embodiments, the identified mislabels are displayed in a graphical user interface 150 for users' review. In some embodiments, the prediction label is also suggested to the user as a possible correct label. In some embodiments, the system 100 automatically replaces the identified mislabels with the prediction labels. Traditionally, a user may be presented with each sample image for review. The user may visually examine each of the samples to determine whether a label on the sample image is correct or not, which is time-consuming and error-prone. The embodiments described herein address this issue by providing a method for identifying mislabeled samples and presenting the mislabeled samples to users, wherein the system 100 highlights areas that may have been mislabeled in a sample, and suggests a correct label to the user for replacing an incorrect label, resulting in an improved system and user interface for reviewing training samples and correcting mislabeled training samples.

Figure 3C:
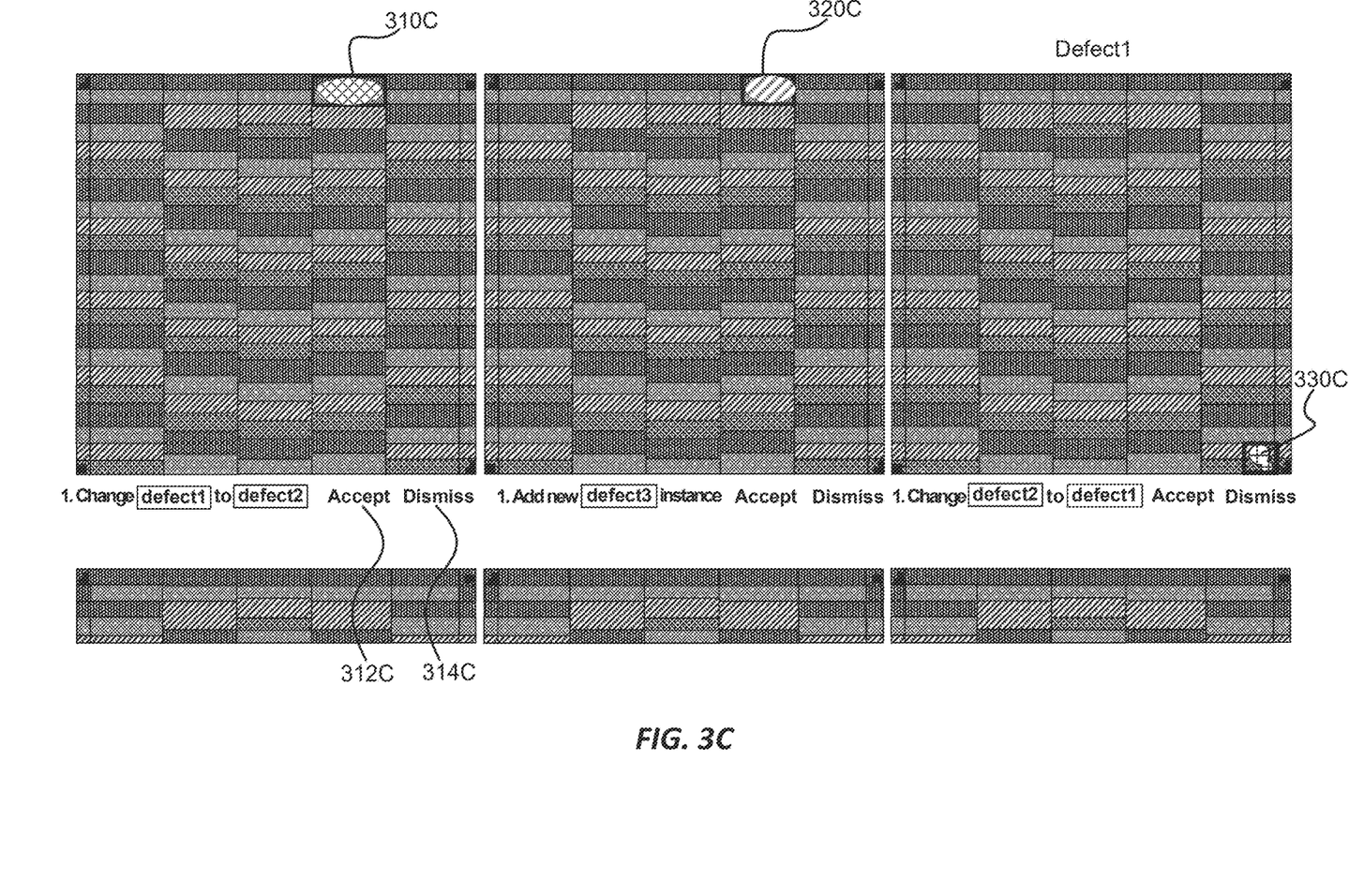
FIG. 3C illustrates an example user interface that shows a user detected mislabels and possible corrections, according to some embodiments.

FIG. 3C illustrates an example user interface that presents detected mislabels 310C, 320C, 330C, and possible corrections. On the left side of FIG. 3C, the system 100 detects a first mislabel 310C and suggests changing the previous label "defect 1" to "defect 2." A user is presented with an accept icon 312C or a dismiss icon 314C for accepting or dismissing the suggestion. In the middle section of FIG. 3C, the system 100 detects a second mislabel 320C and suggests adding a label "defect 3" to the area corresponding to the second mislabel 320C. Similarly, the system 100 presents options for users to accept or dismiss the suggestion by clicking the accept or dismiss icon. On the right side of FIG. 3C, the system 100 detects a third mislabel 330C and suggests changing the previous label "defect 2" to "defect 1." Again, the system presents options for users to accept or dismiss the suggestion by clicking the accept or dismiss icon. The system 100 may also record the user's action of accepting or dismissing the suggestion, indicating that the corresponding labels are highly confident.

Figure 4:
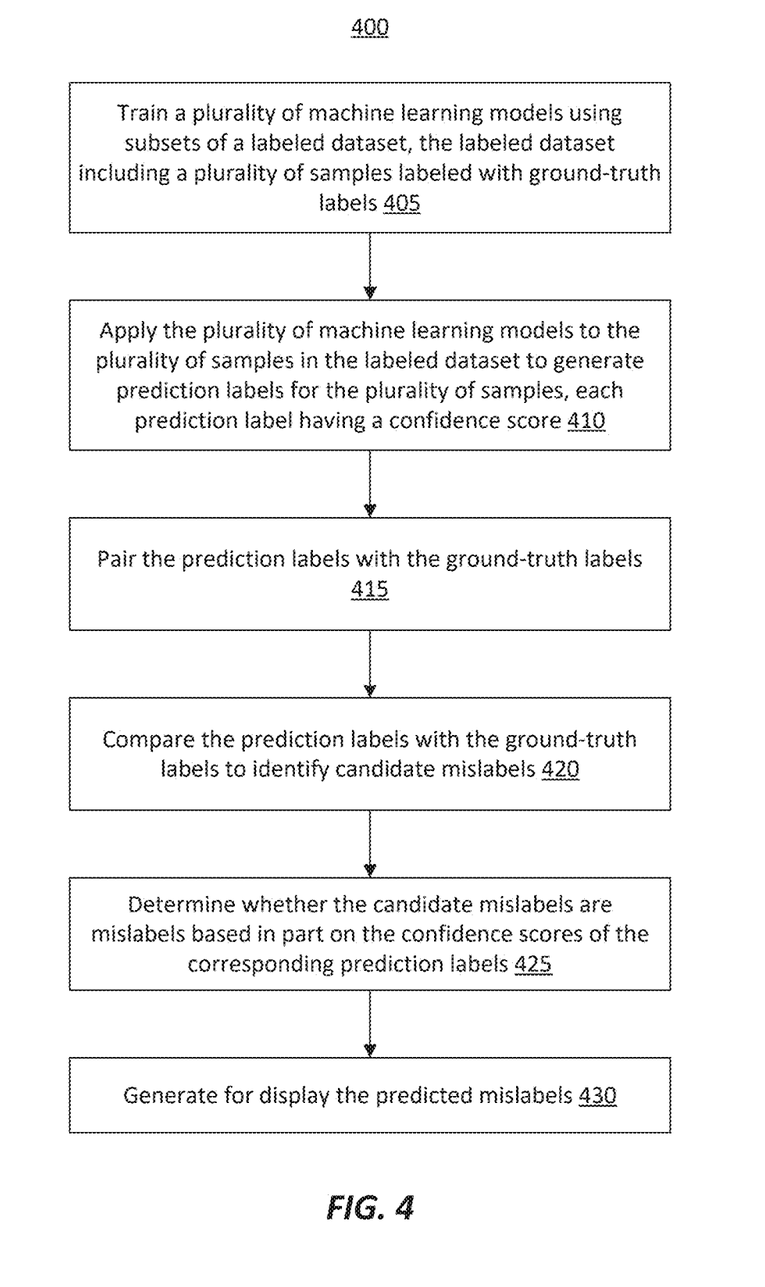
FIG. 4 is a flowchart of one embodiment of a method for identifying mislabels in a labeled dataset, according to some embodiments.

FIG. 4 is a flowchart of one embodiment of a method 400 for identifying mislabels in a labeled dataset. In various embodiments, the method 400 includes different or additional steps than those described in conjunction with FIG. 4. Further, in some embodiments, the steps of the method may be performed in different orders than the order described in conjunction with FIG. 4. The method described in conjunction with FIG. 4 may be carried out by the system 100 in various embodiments, while in other embodiments, the steps of the method are performed by any system capable of retrieving a labeled dataset.

The system 100 trains 405 a plurality of machine learning models using subsets of a labeled dataset. The labeled dataset includes a plurality of samples labeled with ground-truth labels. For example, the system may divide the labeled dataset into two subsets, namely a first subset and a second subset. The first subset is used to train a first machine-learning model, and the second subset is used to train a second machine-learning model. As another example, the system may divide the labeled dataset into N subsets. Each N−1 subsets are used to train a machine-learning model, resulting in a total of N machine-learning models being trained.

The system 100 then applies 410 the plurality of machine-learning models to the plurality of samples in the labeled dataset to generate prediction labels for the plurality of samples. Each prediction label has a confidence score, indicating how likely that the prediction label is correct. For example, when two machine-learning models are trained using the first subset and the second subset of the labeled dataset respectively, the first machine-learning model is applied to the second subset of samples to generate prediction labels for the second subset of samples, and the second machine-learning model is applied to the first subset of samples to generate prediction labels for the first subset of samples. Similarly, when N machine-learning models are trained over N−1 subsets of the labeled dataset, each of the N machine-learning models is applied to the remaining subset (also referred to as its hold-out test subset) to generate prediction labels. As such, each of the samples in the labeled dataset may be relabeled with a prediction label.

The system 100 pairs 415 the prediction labels with the ground-truth labels. In some embodiments, when the machine-learning models are classification models, each sample corresponds to one ground-truth label and one prediction label. The ground-truth label and the prediction label corresponding to a same sample are paired together. In some embodiments, when the machine-learning models are segmentation models, each pixel in a sample corresponds to one ground-truth label and one prediction label. The ground truth label and the prediction label corresponding to a same pixel are paired together.

In some embodiments, when the machine-learning models are object detection models, each ground-truth label or prediction label corresponds to an area. The system determines whether a ground-truth label is to be paired with a particular prediction label based on whether their corresponding areas overlap. Additional details related to pairing prediction labels with ground-truth labels of object detection models are further described below with respect to FIG. 5.

The system 100 then compares 420 the prediction labels with the ground-truth labels to identify candidate mislabels. In some embodiments, when the machine-learning models are classification models, each sample corresponds to one ground-truth label and one prediction label. The ground-truth label and the prediction label corresponding to a same sample are paired together. In some embodiments, when the machine-learning models are segmentation models, each pixel in a sample corresponds to one ground-truth label and one prediction label. The ground truth label and the prediction label corresponding to a same pixel are paired together.

The system then determines 425 whether the candidate mislabels are mislabels based in part on the confidence scores of the corresponding prediction labels. In some embodiments, such a prediction is further based on an overall confidence level of all the predicted labels. In some embodiments, the system sets a threshold based on the prediction labels' overall confidence level. In some embodiments, when the machine-learning models are classification models or segmentation models, the overall confidence level of all the prediction labels may be set as same as the overall confidence level. For example, if the overall confidence level is 0.7, the threshold may be set as the same as the overall confidence level (=0.7), or as a function of the overall confidence level. When a confidence score of a prediction label corresponding to a candidate mislabel is greater than the threshold, the system determines that there is a mislabel.

In some embodiments, when the machine-learning models are object detection models, there is an overall confidence level for each class (corresponding to each type of object). A threshold is set for each class. For example, the object detection models are configured to detect defect 1 and defect 2, where defect 1 has an overall confidence level of 0.8, and defect 2 has an overall confidence level of 0.7. As such, a first confidence threshold for defect 1 may be set as 0.8, and a second confidence threshold for defect 2 may be set as 0.7. When a confidence score of a prediction label corresponding to a candidate mislabel is 0.75: if the prediction label is defect 1 (which corresponds to the first confidence threshold of 0.8), the confidence score 0.75 is not greater than the first confidence threshold 0.8; thus, no mislabel is detected; on the other hand, if the prediction label is defect 2 (which corresponds to the second confidence threshold of 0.7), the confidence score 0.75 is greater than the second confidence threshold 0.7; thus, a mislabel is detected.

In some embodiments, the system generates 430 for display the predicted mislabels. In some embodiments, the system displays an image highlighting an area that is associated with a mislabel. In some embodiments, the system also displays the ground truth label and the prediction label next to the highlighted area. In some embodiments, the system also suggests relabeling the ground truth label with the prediction label. For example, the system may suggest relabeling a label of defect 1 to a label of defect 2. Alternatively, or in addition, the system may suggest adding a new defect instance (e.g., defect 3). In some embodiments, the system automatically relabels the predicted mislabels. In some embodiments, the system presents an accept or dismiss option to the user, such that the user can accept (e.g., relabeling the mislabel with a prediction label) or dismiss (e.g., keeping the original ground truth label) the suggestions.

The methods and systems described above may be implemented at one or more computer systems. The one or more computer systems may be local or remote to users. In some embodiments, the one or more computer systems may provide a cloud service. Users can upload training dataset to the cloud service for processing.

Figure 5:
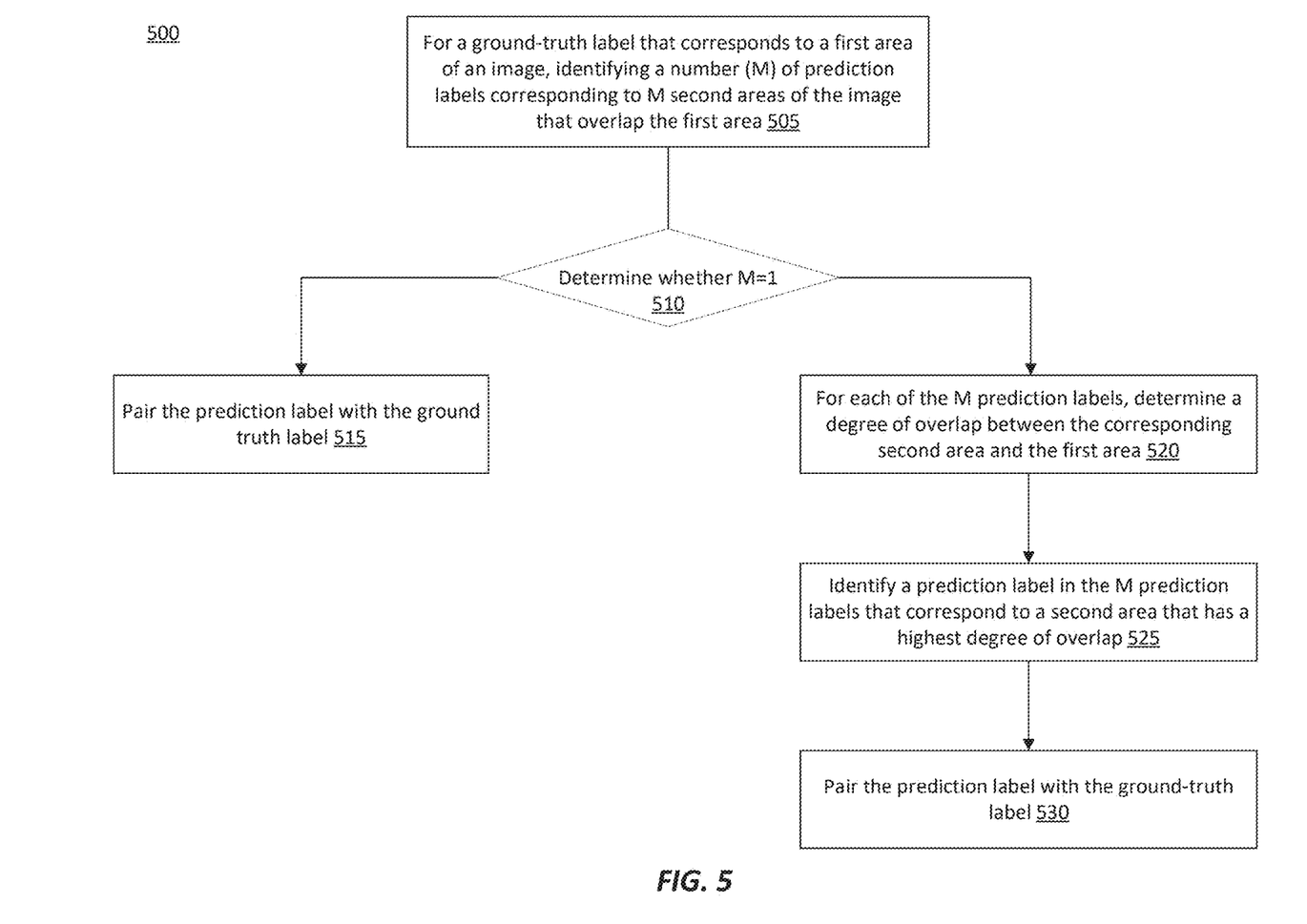
FIG. 5 is a flowchart of a method for pairing a ground truth label with a prediction label, according to some embodiments.

FIG. 5 is a flowchart of one embodiment of a method 500 for pairing a prediction label with a ground-truth label for object recognition models. In various embodiments, the method 500 includes different or additional steps than those described in conjunction with FIG. 5. Further, in some embodiments, the steps of the method may be performed in different orders than the order described in conjunction with FIG. 5. The method described in conjunction with FIG. 5 may be carried out by the system 100 in various embodiments, while in other embodiments, the steps of the method are performed by any system capable of retrieving a labeled dataset.

For a ground-truth label that corresponds to a first area of an image, the system identifies 505 a number (M) of prediction labels corresponding to M second areas of the image that overlap the first area, where M is a natural number. The system determines 510 whether M equals 1. When M equals 1, the system pairs 515 the prediction label with the ground truth label.

On the other hand, when M is greater than 1, for each of the M prediction labels, the system determines 520 a degree of overlap between the corresponding second area and the first area. In some embodiments, the degree of overlap may be determined based in part on a number of pixels in the second area overlapping with pixels in the first area. Alternatively, or in addition, the degree of overlap may be determined based in part on a percentage of pixels in the second area overlapping with pixels in the first area, or a percentage of pixels in the first area overlapping the pixels in the second area.

The system identifies 525 a prediction label in the M prediction labels that correspond to an area that has a highest degree of overlap, and pairs 530 the identified prediction label with the ground-truth label. In some embodiments, the M−1 prediction labels may or may not be paired with another ground truth label. If a prediction label in the M−1 prediction labels is not paired with another ground truth label, the second area of the prediction label may also be identified as a candidate mislabel, and the system may also determine that the second area of the prediction label is a mislabel when a confidence score of the prediction label is sufficiently high.

Figure 6:
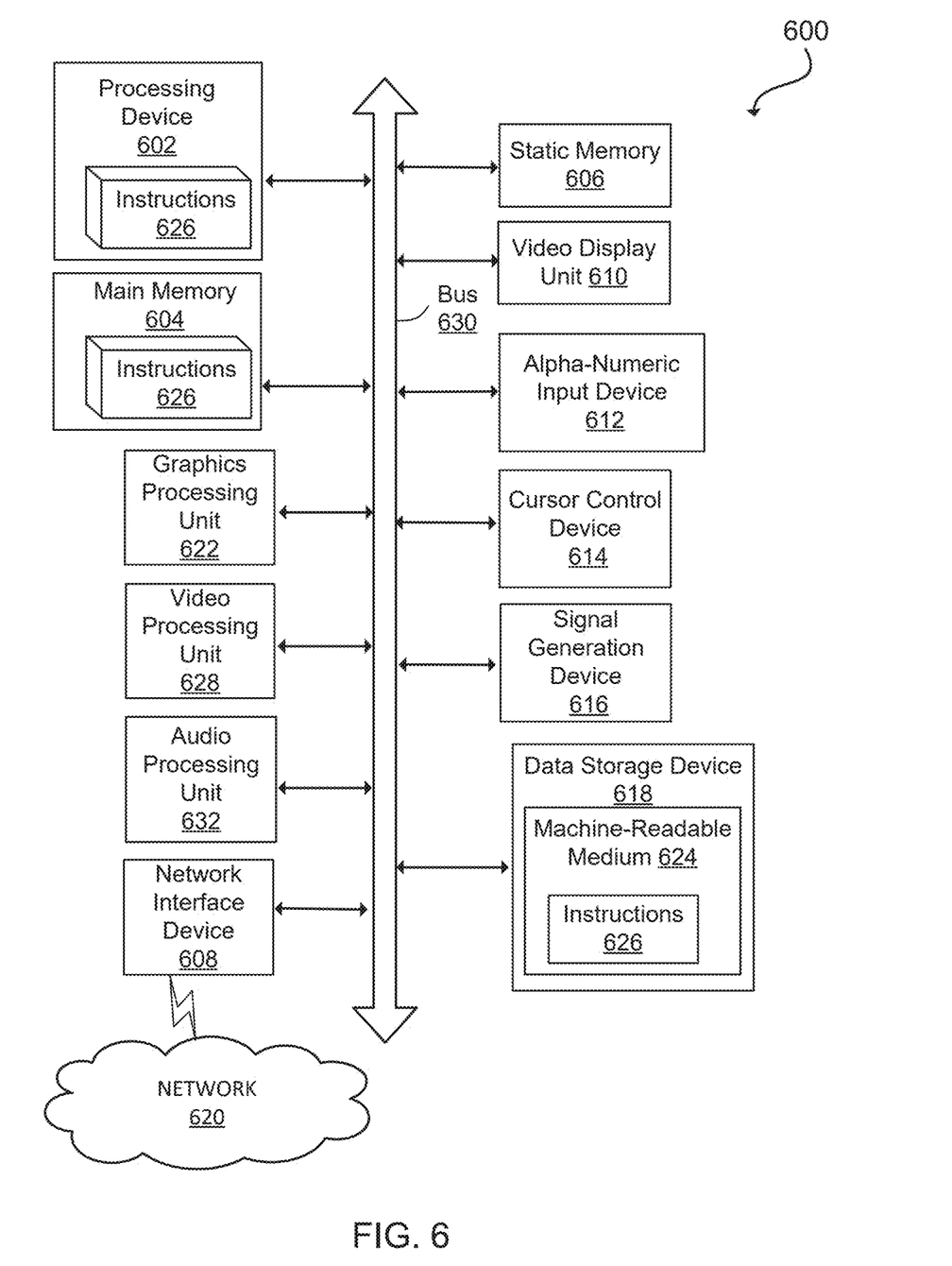
FIG. 6 is a diagram of an example computer system in which embodiments of the present disclosure may operate, according to some embodiments.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM), a static memory 606 (e.g., flash memory, static random access memory (SRAM), etc.), and a data storage device 618, which communicate with each other via a bus 630.

Processing device 602 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may be configured to execute instructions 626 for performing the operations and steps described herein.

The computer system 600 may further include a network interface device 608 to communicate over the network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), a graphics processing unit 622, a signal generation device 616 (e.g., a speaker), graphics processing unit 622, video processing unit 628, and audio processing unit 632.

The data storage device 618 may include a machine-readable storage medium 624 (also known as a non-transitory computer-readable medium) on which is stored one or more sets of instructions 626 or software embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media.

In some implementations, the instructions 626 include instructions to implement functionality corresponding to the present disclosure. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 602 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A computer-implemented method for identifying mislabels in a labeled dataset, the method comprising:
   accessing a training dataset comprising a plurality of labeled samples, each of the plurality of labeled samples labeled with a ground-truth label;
   dividing the plurality of labeled samples into a plurality of training subsets and hold-out test subsets;
   for each of a training subset and a corresponding hold-out test subset in the plurality of training subsets and hold-out test subsets,
      training a machine learning model using a corresponding training subset; and
      applying the trained machine learning model to a corresponding hold-out test subset to generate prediction labels for samples in the corresponding hold-out test subset, wherein each prediction label has a confidence score indicating a likelihood that the prediction label is correct;
   pairing prediction labels and ground truth labels corresponding to same samples;
   comparing a pair of prediction label and ground truth label corresponding to a same sample to determine whether there is a candidate mislabel;
   determining whether the candidate mislabel is a mislabel based in part on a confidence score of the prediction label; and
   generating for display the determined mislabel.

2. The computer-implemented method of claim 1, wherein dividing the plurality of labeled samples into a plurality of pairs of training subset and hold-out test subset comprises:
   dividing the plurality of labeled samples into N subsets, wherein N is a natural number that is greater than 1;
   for each of N subsets,
      selecting the subset as a hold-out test subset; and
      selecting remaining (N−1) subsets as a training subset.

3. The computer-implemented method of claim 1, wherein the labeled dataset comprises a plurality of images, each of the plurality of images being labeled as a positive class or negative class, and each machine-learning model is trained as a classification model.

4. The computer-implemented method of claim 1, wherein the labeled dataset comprises a plurality of images, pixels of each of the plurality of images are labeled as positive or negative, and each machine-learning model is trained as segmentation models.

5. The computer-implemented method of claim 1, wherein the labeled dataset comprises a plurality of images, areas of each of the plurality of images are labeled as one of a plurality of objects, and each machine-learning model is trained as object detection models.

6. The computer-implemented method of claim 5, wherein pairing the prediction labels with the ground-truth labels comprises:
   for a ground-truth label that corresponds to a first area of an image, identifying M prediction labels corresponding to M second areas of the image that overlap the first area, where M is a natural number; and
   responsive to determining that M=1, pairing the prediction label with the ground-truth label.

7. The computer-implemented method of claim 6, wherein pairing the prediction labels with the ground-truth labels further comprises:
   responsive to determining that M>1,
      for each of the M prediction labels, determining a degree of overlap between the corresponding second area and the first area;
      identifying a prediction label in the M prediction labels that correspond to a highest degree of overlap; and
      pairing the prediction label with the ground-truth label.

8. The computer-implemented method of claim 1, wherein each machine-learning model is a classification model or a segmentation model,
   a threshold is set based on an overall confidence level of all the prediction labels, and
   when a confidence level of a prediction label corresponding to a candidate mislabel is greater than the threshold, the corresponding ground-truth label is determined as a mislabel.

9. The computer-implemented method of claim 1, wherein each machine-learning model is an object detection model configured to detect a plurality of classes of object,
   wherein for each class of object, a class threshold is set based on an overall class confidence level, and
   wherein when a confidence level of a prediction label of a class corresponding to a candidate mislabel is greater than the class threshold, the corresponding ground-truth label is determined as a mislabel.

10. A computer program product, comprising a non-transitory computer-readable medium having instructions encoded thereon that, when executed by one or more processors, cause the one or more processors to:
   access a training dataset comprising a plurality of labeled samples, each of the plurality of labeled samples labeled with a ground-truth label;
   divide the plurality of labeled samples into a plurality of training subsets and hold-out test subsets;
   for each of a training subset and a corresponding hold-out test subset in the plurality of training subsets and hold-out test subsets,
      train a machine learning model using a corresponding training subset; and
      apply the trained machine learning model to a corresponding hold-out test subset to generate prediction labels for samples in the corresponding hold-out test subset, wherein each prediction label has a confidence score indicating a likelihood that the prediction label is correct;
pair prediction labels and ground truth labels corresponding to same samples;
compare a pair of prediction label and ground truth label corresponding to a same sample to determine whether there is a candidate mislabel;
determine whether the candidate mislabel is a mislabel based in part on a confidence score of the prediction label; and
generate for display the determined mislabel.

11. The computer program product of claim 10, wherein dividing the plurality of labeled samples into a plurality of pairs of training subset and hold-out test subset comprises:
dividing the plurality of labeled samples into N subsets, where N is a natural number that is greater than 1;
for each of N subsets,
selecting the subset as a hold-out test subset; and
selecting remaining (N−1) subsets as a training subset.

12. The computer program product of claim 10, wherein the labeled dataset comprises a plurality of images, each of the plurality of images being labeled as a positive class or negative class, and each machine-learning model is trained as a classification model.

13. The computer program product of claim 10, wherein the labeled dataset comprises a plurality of images, pixels of each of the plurality of images are labeled as positive or negative, and each machine-learning model is trained as segmentation models.

14. The computer program product of claim 10, wherein the labeled dataset comprises a plurality of images, areas of each of the plurality of images are labeled as one of a plurality of objects, and each machine-learning model is trained as object detection models.

15. The computer program product of claim 14, wherein pairing the prediction labels with the ground-truth labels comprises:
for a ground-truth label that corresponds to a first area of an image, identifying M prediction labels corresponding to M second areas of the image that overlap the first area, where M is a natural number; and
responsive to determining that M=1, pairing the prediction label with the ground-truth label.

16. The computer program product of claim 15, wherein pairing the prediction labels with the ground-truth labels further comprises:
responsive to determining that M>1,
for each of the M prediction labels, determining a degree of overlap between the corresponding second area and the first area;
identifying a prediction label in the M prediction labels that correspond to a highest degree of overlap; and
pairing the prediction label with the ground-truth label.

17. The computer program product of claim 10, wherein each machine-learning model is a classification model or a segmentation model,
a threshold is set based on an overall confidence level of all the prediction labels, and
when a confidence level of a prediction label corresponding to a candidate mislabel is greater than the threshold, the corresponding ground-truth label is determined as a mislabel.

18. The computer program product of claim 10, wherein each machine-learning model is an object detection model configured to detect a plurality of classes of object,
for each class of object, a class threshold is set based on an overall class confidence level, and
when a confidence level of a prediction label of a class corresponding to a candidate mislabel is greater than the class threshold, the corresponding ground-truth label is determined as a mislabel.

19. A computer system, comprising:
one or more processors; and
a non-transitory computer-readable medium, having instructions encoded thereon that, when executed by the one or more processors processor, cause the one or more processors to:
access a training dataset comprising a plurality of labeled samples, each of the plurality of labeled samples labeled with a ground-truth label;
divide the plurality of labeled samples into a plurality of training subsets and hold-out test subsets;
for each of a training subset and a corresponding hold-out test subset in the plurality of training subsets and hold-out test subsets,
train a machine learning model using a corresponding training subset; and
apply the trained machine learning model to a corresponding hold-out test subset to generate prediction labels for samples in the corresponding hold-out test subset, wherein each prediction label has a confidence score indicating a likelihood that the prediction label is correct;
pair prediction labels and ground truth labels corresponding to same samples;
compare a pair of prediction label and ground truth label corresponding to a same sample to determine whether there is a candidate mislabel;
determine whether the candidate mislabel is a mislabel based in part on a confidence score of the prediction label; and
generate for display the determined mislabel.

20. The computer system of claim 19, wherein dividing the plurality of labeled samples into a plurality of pairs of training subset and hold-out test subset comprises:
dividing the plurality of labeled samples into N subsets, where N is a natural number that is greater than 1;
for each of N subsets,
selecting the subset as a hold-out test subset; and
selecting a remaining (N−1) subsets as a training subset.

* * * * *